United States Patent
Allal

(10) Patent No.: US 11,166,136 B2
(45) Date of Patent: Nov. 2, 2021

(54) METHOD OF SECURING A MOBILE TERMINAL AND CORRESPONDING TERMINAL

(71) Applicant: Orange, Paris (FR)

(72) Inventor: Imed Allal, Lannion (FR)

(73) Assignee: Orange, Paris (FR)

( * ) Notice: Subject to any disclaimer, the term of this patent is extended or adjusted under 35 U.S.C. 154(b) by 285 days.

(21) Appl. No.: 15/781,586

(22) PCT Filed: Dec. 6, 2016

(86) PCT No.: PCT/FR2016/053216
§ 371 (c)(1),
(2) Date: Jun. 5, 2018

(87) PCT Pub. No.: WO2017/098127
PCT Pub. Date: Jun. 15, 2017

(65) Prior Publication Data
US 2020/0267548 A1 Aug. 20, 2020

(30) Foreign Application Priority Data
Dec. 7, 2015 (FR) ..................................... 1561935

(51) Int. Cl.
| | |
|---|---|
| *H04W 12/126* | (2021.01) |
| *H04W 4/70* | (2018.01) |
| *H04W 8/24* | (2009.01) |
| *H04W 12/06* | (2021.01) |
| *H04W 12/71* | (2021.01) |
| *H04W 88/06* | (2009.01) |

(52) U.S. Cl.
CPC ............... *H04W 4/70* (2018.02); *H04W 8/24* (2013.01); *H04W 12/06* (2013.01); *H04W 12/126* (2021.01); *H04W 12/71* (2021.01); *H04W 88/06* (2013.01)

(58) Field of Classification Search
CPC ... H04W 12/06; H04W 12/1206; H04W 8/24; H04W 88/06; H04W 12/126
See application file for complete search history.

(56) References Cited

U.S. PATENT DOCUMENTS

2004/0236917 A1* 11/2004 Miyahara ............... G06F 21/123
711/163
2005/0280557 A1* 12/2005 Jha ......................... H04W 4/029
340/988

(Continued)

FOREIGN PATENT DOCUMENTS

CN 100362884 C 1/2008

OTHER PUBLICATIONS

The International Search Report from the International Application No. PCT/FR2016/053216 application.

*Primary Examiner* — Barry W Taylor
(74) *Attorney, Agent, or Firm* — Haverstock & Owens LLP

(57) ABSTRACT

The invention relates to a method of securing a mobile terminal (UE) able to communicate with a first telecommunication network (2G, 3G, 4G, 5G). According to the method, the terminal periodically emits a unique identifier from an unmodifiable dedicated memory of the terminal and the identifier is transmitted to a core network of the first telecommunication network via a control channel based on a second telecommunication network (LoRa, IoT) of low energy consumption type.

6 Claims, 1 Drawing Sheet

(56) References Cited

U.S. PATENT DOCUMENTS

| | | | |
|---|---|---|---|
| 2007/0077912 A1 | 4/2007 | Sunil | |
| 2011/0021174 A1* | 1/2011 | Azimi | H04M 1/67 |
| | | | 455/410 |
| 2011/0087782 A1 | 4/2011 | Philippe et al. | |
| 2012/0264400 A1* | 10/2012 | Khan | H04L 63/0876 |
| | | | 455/411 |
| 2015/0067780 A1* | 3/2015 | Gao | H04W 12/08 |
| | | | 726/3 |
| 2016/0088676 A1* | 3/2016 | Zhao | H04W 12/12 |
| | | | 370/328 |
| 2016/0165517 A1* | 6/2016 | McQuaid | H04W 12/08 |
| | | | 455/434 |
| 2016/0183166 A1* | 6/2016 | Chen | H04W 48/02 |
| | | | 455/435.1 |
| 2017/0006528 A1* | 1/2017 | Bari | H04W 4/00 |
| 2018/0160291 A1* | 6/2018 | Burgert | H04W 8/12 |
| 2019/0081716 A1* | 3/2019 | Cole | G01S 19/34 |
| 2019/0289463 A1* | 9/2019 | Glouche | H04W 12/069 |

\* cited by examiner

METHOD OF SECURING A MOBILE TERMINAL AND CORRESPONDING TERMINAL

FIELD OF THE INVENTION

The present invention relates to the field of telecommunications. The invention relates to a method of securing a mobile terminal capable of communicating with a telecommunication network.

The telecommunication network is a network standardized, for example, via 3GPP (LTE, LTE-Adv, etc.), GSM, etc.) which allows the establishment of communications between both mobile and fixed terminals.

Since the GSM standard, mobile terminals have evolved dramatically to become smartphones. They are thus provided with a very good quality screen, fast processors and operating systems allowing a variety of uses with an ever-growing consumption of video images.

These portable objects have become very valuable and often coveted objects.

PRIOR ART

For combating the theft of smartphones, software applications are known such as the commercial products Lookout or FindMyMobile which can be used to geolocate the lost or stolen terminal. The application indicates on a map displayed on a screen the place that it has determined as being where the terminal should be situated. This determination is obtained by searching the network for the unique identifier, IMEI (International Mobile Equipment Identity) and its associated location. This identifier is indeed necessary in the authentication mechanisms implemented on each initialization of a communication. The network keeps track of this identifier each time the terminal communicates and as soon as its communication is handed over to a new base station during a movement of the mobile terminal.

However, these applications are flawed since the IMEI identifier can be modified if the terminal is specifically manipulated or by using applications available on the Internet. By assigning a new IMEI identifier, the thief eludes the geolocation of the terminal via applications such as Lookout or FindMyMobile.

DISCLOSURE OF THE INVENTION

The invention provides a method of securing a mobile terminal capable of communicating with a first telecommunication network. The method comprises the periodic transmission of a unique identifier from the terminal to a core network of the first telecommunication network via a control channel based on a second telecommunication network of a low energy consumption type. The invention further provides a method of securing a mobile terminal capable of communicating with a first telecommunication network such that the method includes periodically transmitting a unique identifier from an unmodifiable dedicated memory of the terminal to a core network of the first telecommunication network via a control channel based on a second telecommunication network of a low energy consumption type.

The invention further provides a mobile terminal comprising a radio interface to a first telecommunication network. The terminal further comprises:
- a wireless interface capable of communicating with a second telecommunication network of a low energy consumption type,
- a memory of a unique identifier of the phone,
- a component capable of controlling the wireless interface so that the identifier stored in the memory is emitted periodically via this interface.

The invention further provides a mobile terminal comprising a radio interface to a first telecommunication network. The terminal further comprises forming an irremovable unit:
- a wireless interface capable of communicating with a second telecommunication network of a low energy consumption type,
- an unmodifiable memory dedicated to backing up a unique identifier of the phone,
- a component capable of controlling the wireless interface so that the identifier stored in the memory is emitted periodically via this interface,
- an autonomous power supply of the unit.

The invention further provides a telecommunication system comprising a first telecommunication network, a core network, a mobile terminal capable of communicating with the first network. The system further comprises a second telecommunication network of a low energy consumption type for transmitting to the core network a unique identifier transmitted by the terminal. The system is such that the terminal is according to the invention.

The invention is therefore a novel solution for combating the theft of mobile terminals. Its implementation requires that it be integrated into the design of the terminals so that the unit forms one body with the terminal and cannot in any event be removed from the terminal. The elements forming this unit may, for example, be distributed at different locations in the terminal and/or be embedded in the shell of the terminal. The power supply of the elements of the unit is completely separate from the power supply of the rest of the terminal. It may be based on a microbattery which forms part of the unit, the service life of which provides an autonomy compatible with the average life of a terminal. The physical separation from the rest of the electronic components of the terminal ensures the absence of any software security flaw.

The unmodifiable memory stores a unique identifier of the terminal, which may be the IMEI originally assigned to the terminal. This identifier may equally well be an identifier of a new type with more characters. It is unique in the sense that it is assigned only once; it makes it possible to distinguish any mobile terminal from another mobile terminal. The identifier may optionally be stored in encrypted form. This memory is not accessible from the other elements of the terminal outside the unit, either in reading or writing. Thus, even if a software application is downloaded onto the terminal it will never be able to change this identifier since the download is performed via the radio interface to the first telecommunication network and to a modifiable memory (e.g. RAM) that does not form part of the unit.

The wireless interface is capable of communicating with a second telecommunication network of a low energy consumption type.

The second telecommunication network of a low energy consumption type is used as a transport channel for the identifier. This transmission is secured through the technical features of this network.

The method is applied, for example, when the first telecommunication network is a "mobile network" such as 3G, 4G, 5G, etc. and the second network is a network of sensors such as a LoRa or Sigfox type network and more generally an "IoT (Internet of Things) network".

According to one embodiment of the terminal, the unit constitutes a connected object of a LoRa network.

According to one embodiment, the core network compares the unique identifier with the IMEI identifier provided by the terminal for authentication with the first network, for re-authenticating this mobile. This makes it possible to centrally control the authenticity of the terminals and to introduce centralized combat measures.

According to one embodiment, the unique identifier is compared by the core network to a file of mobile terminals reported as stolen or lost. The method makes it possible to quickly prevent the use of the terminal recognized as stolen or lost by the core network.

LIST OF FIGURES

Other features and advantages of the invention will appear more clearly on reading the following description of particular embodiments of the invention, given by way of simple, illustrative and non-restrictive examples, and the following appended drawings.

DESCRIPTION OF EMBODIMENTS OF THE INVENTION

Figure 1:
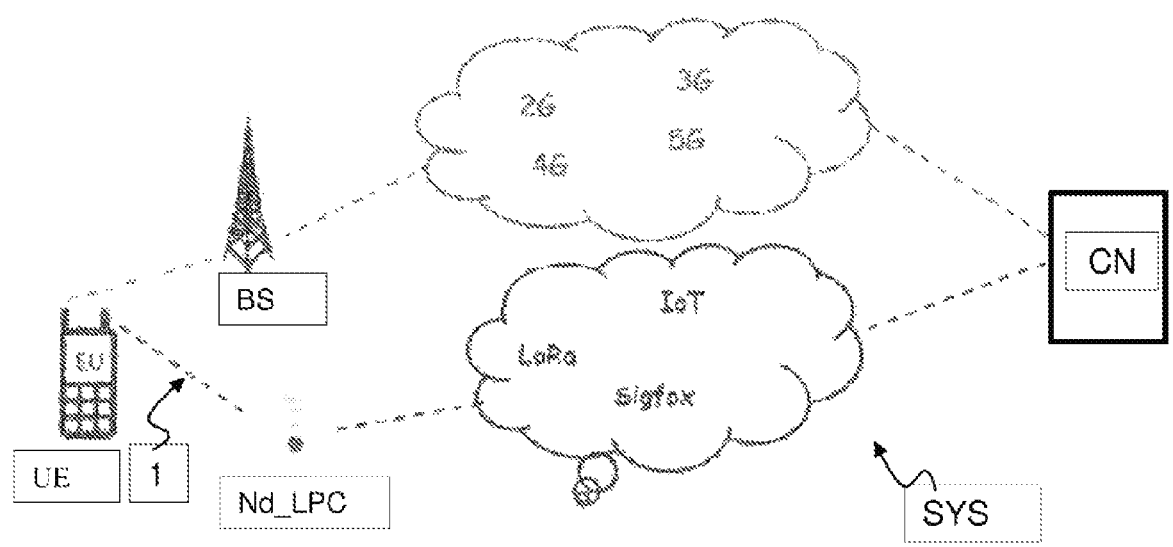
FIG. 1 is a diagram of a telecommunication system according to the invention.

The architecture associated with the method of securing is illustrated by FIG. 1. The illustrated telecommunication system SYS comprises:
- a core network CN,
- an access network of a first telecommunication network,
- a base station BS of the access network,
- a second telecommunication network of a low energy consumption type,
- a mobile terminal UE provided with a connected object IoT_O.

The first telecommunication network is, for example, a mobile network of the 2G, 3G, 4G, 5G, etc. type.

The second network is, for example, a network as defined by the LoRa Alliance or provided by the operator Sigfox. Such a network is sometimes designated by the acronym IoT (Internet of Things). The network consists of Nd_LPC (Node Low Power Consumption) nodes and gateways to the core network. The Nd_LPC nodes are provided with a radio interface with a generally greater range than the range of the base stations of the access network. This network may thus cover a large geographical area with few devices. Such a network is dedicated to low-throughput communications.

The links between the nodes of the second network and the core network are of a known standardized type and commonly termed "backhaul". The same applies to the links between the base stations of the access network and the core network.

The radio range of the Nd_LPC nodes may be greater than that of the base stations.

Figure 2:
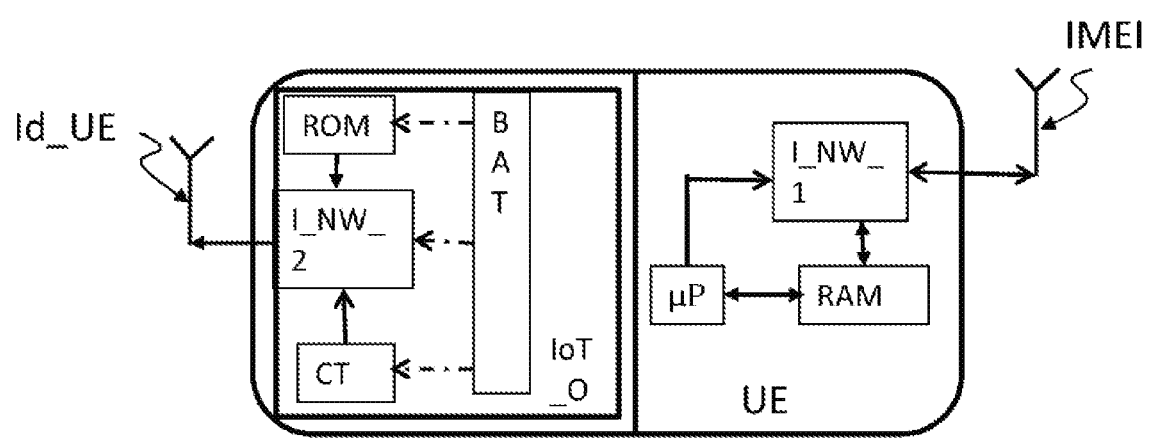
FIG. 2 is a diagram of a terminal according to the invention.

The mobile terminal UE illustrated by FIG. 2 comprises in a known manner a radio interface I_NW_1 to the access network of the first telecommunication network together with a microprocessor μP and modifiable memory RAM. It is thus possible to establish communications via this access network. This terminal is further provided with a connected object IoT_O. This object forms an irremovable unit with the body of the terminal or with its motherboard. This object comprises:
- a wireless interface I_NW_2 capable of communicating with the second telecommunication network of a low energy consumption type,
- an unmodifiable memory ROM dedicated to backing up a unique identifier of the phone,
- an electronic component CT capable of controlling the interface I_NW_2 so that the identifier stored in the memory ROM is transmitted periodically via this interface,
- an autonomous power supply BAT of the object.

The identifier may optionally be encapsulated in a packet or message before being transmitted. The Nd_LPC nodes receive the identifier, Id_UE, and transmit it to the core network. Furthermore, the mobile terminal is authenticated with the first network each time that it establishes a new communication. This authentication is based on the IMEI identifier associated with the terminal and takes place according to known mechanisms that are generally specified in a technical specification of the telecommunication standard. The core network may thus retrieve from the first network either the IMEI identifier, or an image of this IMEI identifier. It may thus compare these data with the terminal's identifier Id_UE and determine whether the IMEI identifier provided is original, i.e. identical to the identifier or whether it has been modified i.e. different from the identifier. If the IMEI identifier provided has been modified there is a very significant probability that the terminal is being used fraudulently, e.g. following a theft. The core network may compare the terminal's identifier Id_UE with a file of terminals reported as stolen or lost.

The core network may retrieve location information for the terminal, via the first network by known mechanisms: the phone's GPS, identification of the base station, etc. According to one embodiment, the core network may retrieve location information for the terminal, via the second network. A first mechanism for locating the terminal may be based on a triangulation between a plurality of Nd_LPC nodes which receive the periodic emission from the same terminal. This requires a sufficient deployment of nodes for implementing this triangulation. A second mechanism for locating the mobile terminal may be based on the retrieval of the GPS position of this terminal by the node via an interface of the terminal suited to the second telecommunications network. This interface is different from that which transmits the identifier for keeping a complete separation between the memory of the identifier and the rest of the terminal in the event that the rest of the terminal has access to the GPS position.

The core network may thus locate a stolen terminal on a map and transmit such information to a police department for recovering this terminal with its information.

According to one use, the first communications network is a 5G network which is being standardized within the 3GPP (LTE-A).

The invention claimed is:

1. A method of securing a mobile terminal capable of communicating with a first telecommunication mobile network, comprising:
when establishing a communication via the first mobile network, the transmission of a current identifier by the terminal to a core network via the first mobile network for a first authentication of the terminal,
the terminal sending periodically a backup of an original unique identifier of the terminal secured in, an unmodifiable dedicated memory of an internet of things (IoT) object of the terminal, to the core network of the first telecommunication network via a control channel based on a second telecommunication IoT network of a low energy consumption type to confirm or not the first authentication of the terminal by the core network by comparing the current identifier with the original unique identifier and determining whether the current identifier is original or not.

2. The method as claimed in claim 1, in which the original unique identifier is compared by the core network to a file of mobile terminals reported as stolen or lost.

3. A mobile terminal comprising:
- a radio interface to a first telecommunication mobile network,
- a first memory for storing a current identifier transmitted via the radio interface to a core network for a first authentication of the terminal,
- a wireless interface capable of communicating with a second telecommunication internet of things (IoT) network of a low energy consumption type,
- a second unmodifiable dedicated memory of an IoT object for storing an original unique identifier of the terminal,
- a component capable of controlling the interface so that the original unique identifier, secured in the second unmodifiable dedicated memory, is transmitted periodically to the core network via this wireless interface for comparison with the current identifier sent via the radio interface and for determining whether the current identifier is original or not to confirm or not the first authentication of the terminal by the core network.

4. The mobile terminal as claimed in claim 3 further comprising an autonomous power supply of a unit formed of the wireless interface capable of communicating with the second IoT network, the second memory, the component and the power supply and such that the second memory is unmodifiable and dedicated to backing up the original unique identifier.

5. A telecommunication system comprising a first telecommunication mobile network, a core network, a mobile terminal capable of communicating with the first mobile network by means of a radio interface, the terminal comprising:
- a wireless interface capable of communicating with a second telecommunication internet of things (IoT) network of a low energy consumption type,
- a first memory for storing a current identifier transmitted via the radio interface to a core network for a first authentication of the terminal,
- a second unmodifiable dedicated memory of an IoT object for storing an original unique identifier of the terminal,
- a component capable of controlling the interface so that the original unique identifier secured in the second unmodifiable dedicated memory is transmitted periodically to the core network via this wireless interface and wherein the system further comprises:
- the second telecommunication IoT network of a low energy consumption type for transmitting to the core network the original unique identifier transmitted by the terminal for comparison with the current identifier sent via the radio interface and for determining whether the current identifier is original or not to confirm or not the first authentication of the terminal by the core network.

6. The telecommunication system as claimed in claim 5 such that the terminal further comprises an autonomous power supply of a unit formed of the wireless interface capable of communicating with the second IoT network, the memory, the component and the power supply and such that the memory is unmodifiable and dedicated to backing up the original unique identifier.

* * * * *